(12) United States Patent  (10) Patent No.: US 8,681,356 B2
Shimizu  (45) Date of Patent: Mar. 25, 2014

(54) INFORMATION PROCESSING APPARATUS

(75) Inventor: Hideaki Shimizu, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 653 days.

(21) Appl. No.: 12/789,338

(22) Filed: May 27, 2010

(65) Prior Publication Data

US 2010/0315674 A1  Dec. 16, 2010

(30) Foreign Application Priority Data

Jun. 16, 2009  (JP) ................................. 2009-143473

(51) Int. Cl.
G06F 3/12  (2006.01)
(52) U.S. Cl.
USPC ......................................................... 358/1.15
(58) Field of Classification Search
USPC .................... 358/1.13–1.18; 710/8
See application file for complete search history.

(56) References Cited

U.S. PATENT DOCUMENTS

| 2006/0090143 A1* | 4/2006 | Tanaka ........................... 715/810 |
| 2006/0203256 A1* | 9/2006 | Hagiwara ....................... 358/1.1 |
| 2008/0030818 A1 | 2/2008 | Nagahara et al. |
| 2008/0195663 A1 | 8/2008 | Sekine |
| 2008/0273216 A1* | 11/2008 | Moro et al. ..................... 358/1.9 |
| 2009/0040547 A1* | 2/2009 | Ferlitsch ....................... 358/1.15 |

FOREIGN PATENT DOCUMENTS

| JP | 09-230746 | 9/1997 |
| JP | 11-342660 | 12/1999 |
| JP | 2005-111828 | 4/2005 |
| JP | 2006-252515 | 9/2006 |
| JP | 2008-040690 | 2/2008 |
| JP | 2008-194953 | 8/2008 |

OTHER PUBLICATIONS

Notice of Reasons for Refusal for appl. 2009-143473, mailed Apr. 26, 2011, 2 pgs.
Translation of Notice of Reasons for Refusal for appl. 2009-143473, mailed Apr. 26. 2011, 3 pgs.

* cited by examiner

*Primary Examiner* — King Poon
*Assistant Examiner* — Kent Yip
(74) *Attorney, Agent, or Firm* — Squire Sanders (US) LLP

(57) ABSTRACT

Disclosed is the information processing apparatus, which makes it possible to easily conduct a setting change operation for a plurality of setting items after the concerned setting operation has been completed. The information processing apparatus includes: an operating section to establish a set of setting values corresponding to a plurality of setting items, therefrom; a storage section to store the set of setting values established from the operating section, therein; a display section; and a controlling section to control the display section. When receiving a request for changing the set of setting values established in advance through the operating section, the controlling section controls the display section so as to display at least one candidate of change contents onto the display section, based on differential components between the set of setting values established in advance and another set of setting values stored in the storage section.

9 Claims, 12 Drawing Sheets

FIG. 2

| | PRINTING COLOR | PRINTING SURFACE | PUNCHING | STAPLING |
|---|---|---|---|---|
| 1 | COLOR | DUPLEX | ABSENCE | ABSENCE |
| 2 | MONOCHROME | DUPLEX | PRESENCE | ABSENCE |
| 3 | MONOCHROME | DUPLEX | ABSENCE | ABSENCE |
| 4 | COLOR | ONE SIDE | ABSENCE | PRESENCE |
| 5 | MONOCHROME | DUPLEX | ABSENCE | PRESENCE |
| 6 | COLOR | ONE SIDE | PRESENCE | ABSENCE |
| 7 | COLOR | DUPLEX | PRESENCE | PRESENCE |
| 8 | COLOR | DUPLEX | PRESENCE | ABSENCE |
| 9 | MONOCHROME | ONE SIDE | ABSENCE | PRESENCE |
| 10 | COLOR | ONE SIDE | ABSENCE | ABSENCE |

FIG. 3

| | PRINTING COLOR | PRINTING SURFACE | PUNCHING | STAPLING | ACCORDANCE DEGREE | SCORE VALUE OF CHANGE CONTENTS |
|---|---|---|---|---|---|---|
| 1 | COLOR | DUPLEX | ABSENCE | ABSENCE | 2/4(0.5) | ONE SIDE → DUPLEX: 0.5, DELETION OF PUNCHING: 0.5 |
| 2 | MONOCHROME | DUPLEX | PRESENCE | ABSENCE | 2/4(0.5) | COLOR → MONOCHROME: 0.5, ONE SIDE → DUPLEX: 0.5 |
| 3 | MONOCHROME | DUPLEX | ABSENCE | ABSENCE | 1/4(0.25) | COLOR → MONOCHROME: 0.25, ONE SIDE → DUPLEX: 0.25, DELETION OF PUNCHING: 0.25 |
| 4 | COLOR | ONE SIDE | ABSENCE | PRESENCE | 2/4(0.5) | DELETION OF PUNCHING: 0.5, ADDITION OF STAPLING: 0.5 |
| 5 | MONOCHROME | DUPLEX | ABSENCE | PRESENCE | 0/4(0) | DISACCORD |
| 6 | COLOR | ONE SIDE | PRESENCE | ABSENCE | 4/4(1) | ACCORDANCE (ABSENCE OF DIFFERENTIAL COMPONENT) |
| 7 | COLOR | DUPLEX | PRESENCE | PRESENCE | 2/4(0.5) | ONE SIDE → DUPLEX: 0.5, ADDITION OF STAPLING: 0.5 |
| 8 | COLOR | DUPLEX | PRESENCE | ABSENCE | 3/4(0.75) | ONE SIDE → DUPLEX: 0.75 |
| 9 | MONOCHROME | ONE SIDE | ABSENCE | PRESENCE | 1/4(0.25) | COLOR → MONOCHROME: 0.25, DELETION OF PUNCHING: 0.25, ADDITION OF STAPLING: 0.25 |
| 10 | COLOR | ONE SIDE | ABSENCE | ABSENCE | 3/4(0.75) | DELETION OF PUNCHING: 0.75 |

- CURRENT SETTING: "COLOR" + "ONE SIDE" + "PRESENCE OF PUNCHING" + "ABSENCE OF STAPLING"
- HATCHING: [DIFFERENTIAL COMPONENT]:[SETTING VALUE]
- "ACCORDANCE DEGREE" = "NUMBER OF SETTING ITEMS, SETTING VALUES OF WHICH ARE IN ACCORDANCE WITH EACH OTHER" / "NUMBER OF ALL SETTING ITEMS"
  (→BASED ON ACCORDANCE DEGREE, SCORE VALUE IS ATTACHED TO "DIFFERENTIAL COMPONENT" · "SETTING VALUE" FOR EVERY JOB)
- CHANGE CONTENTS = SETTING VALUES ("DIFFERENTIAL COMPONENT" · "SETTING VALUE")

FIG. 4

| CHANGE CONTENTS | CALCULATION (ADDITION OF SCORE VALUES) | TOTAL SCORE |
| --- | --- | --- |
| ONE SIDE → DUPLEX | 0.5+0.5+0.25+0.5+0.75 | 2.5 |
| DELETION OF PUNCHING | 0.5+0.25+0.5+0.25+0.75 | 2.25 |
| ADDITION OF STAPLING | 0.5+0.5+0.25 | 1.25 |
| COLOR → MONOCHROME | 0.5+0.25+0.25 | 1.0 |

FIG. 8

| | PRINTING COLOR | PRINTING SURFACE | PUNCHING | STAPLING | OBJECT OF SCORING CALCULATION |
|---|---|---|---|---|---|
| 1 | COLOR | ONE SIDE | PRESENCE | ABSENCE | A |
|   | COLOR | DUPLEX | ABSENCE | ABSENCE |   |
| 2 | MONOCHROME | ONE SIDE | ABSENCE | ABSENCE | B |
|   | * | * | * | * |   |
| 3 | COLOR | ONE SIDE | PRESENCE | ABSENCE | A |
|   | MONOCHROME | DUPLEB | PRESENCE | ABSENCE |   |
| 4 | COLOR | ONE SIDE | PRESENCE | ABSENCE | A |
|   | MONOCHROME | DUPLEB | ABSENCE | ABSENCE |   |
| 5 | MONOCHROME | ONE SIDE | PRESENCE | ABSENCE | B |
|   | MONOCHROME | DUPLEB | PRESENCE | ABSENCE |   |
| 6 | COLOR | ONE SIDE | PRESENCE | ABSENCE | A |
|   | COLOR | ONE SIDE | ABSENCE | PRESENCE |   |
| 7 | MONOCHROME | DUPLEB | ABSENCE | PRESENCE | B |
|   | * | * | * | * |   |
| 8 | MONOCHROME | DUPLEB | PRESENCE | ABSENCE | B |
|   | MONOCHROME | ONE SIDE | PRESENCE | ABSENCE |   |
| 9 | COLOR | ONE SIDE | PRESENCE | ABSENCE | B |
|   | * | * | * | * |   |
| 10 | COLOR | ONE SIDE | PRESENCE | ABSENCE | A |
|    | COLOR | DUPLEB | PRESENCE | PRESENCE |   |
| 11 | COLOR | ONE SIDE | ABSENCE | PRESENCE | B |
|    | * | * | * | * |   |
| 12 | COLOR | ONE SIDE | PRESENCE | ABSENCE | A |
|    | COLOR | DUPLEB | PRESENCE | ABSENCE |   |
| 13 | COLOR | ONE SIDE | PRESENCE | ABSENCE | A |
|    | MONOCHROME | ONE SIDE | ABSENCE | PRESENCE |   |
| 14 | COLOR | ONE SIDE | ABSENCE | ABSENCE | B |
|    | COLOR | DUPLEB | ABSENCE | ABSENCE |   |
| 15 | COLOR | ONE SIDE | PRESENCE | ABSENCE | A |
|    | COLOR | ONE SIDE | ABSENCE | ABSENCE |   |

• CURRENT SETTING: "COLOR" + "ONE SIDE" + "PRESENCE OF PUNCHING" + "ABSENCE OF STAPLING"
• UPPER AREA: INITIAL SETTING / LOWER AREA: SETTING AFTER CHANGE
• HATCHING: CHANGED ITEM / *: NO CHANGE

FIG. 9

| GROUP OF SETTING ITEMS | SETTING VALUES (OPTIONS) | | | |
|---|---|---|---|---|
| PRINTING COLOR | MONOCHROME | COLOR | - | - |
| PRINTING SURFACE | ONE SIDE | DUPLEX (LEFT STAPLING) | DUPLEX (UPPER STAPLING) | - |
| N IN 1 | ABSENCE | 2 IN 1 | 4 IN 1 | - |
| PUNCHING | ABSENCE | TWO HOLES | THREE HOLES | FOUR HOLES |
| STAPLING | ABSENCE | LEFT CORNER | TWO POINTS | - |

FIG. 10

| | PRINTING COLOR | PRINTING SURFACE | N IN 1 | PUNCHING | STAPLING | ACCORDANCE DEGREE | CORE VALUE OF CHANGE CONTENTS |
|---|---|---|---|---|---|---|---|
| 1 | COLOR | DUPLEX (LEFT STAPLING) | ABSENCE | TWO HOLES | ABSENCE | 4/5(0.8) | PUNCHING (TWO HOLES): 0.8 |
| 2 | MONOCHROME | ONE SIDE | 2 IN 1 | ABSENCE | LEFT CORNER | 1/5(0.2) | PRINTING COLOR (MONOCHROME): 0.2, PRINTING SURFACE (ONE SIDE): 0.2, N IN 1(2 IN 1): 0.2, STAPLING (LEFT CORNER): 0.2 |
| 3 | COLOR | ONE SIDE S | ABSENCE | FOUR HOLES | ABSENCE | 3/5(0.6) | PRINTING SURFACE (ONE SIDE): 0.6, PUNCHING (FOUR HOLES): 0.6 |
| 4 | COLOR | DUPLEX (LEFT STAPLING) | 2 IN 1 | TWO HOLES | ABSENCE | 3/5(0.6) | N IN 1(2 IN 1): 0.6, PUNCHING (TWO HOLES): 0.6 |
| 5 | COLOR | ONE SIDE | 4 IN 1 | TWO HOLES | ABSENCE | 2/5(0.4) | PRINTING SURFACE (ONE SIDE): 0.4, N IN 1(4 IN 1): 0.4, PUNCHING (TWO HOLES): 0.4 |
| 6 | MONOCHROME | DUPLEX (LEFT STAPLING) | ABSENCE | ABSENCE | TWO POINTS | 3/5(0.6) | PRINTING COLOR (MONOCHROME): 0.6, STAPLING (TWO POINTS): 0.6 |
| 7 | COLOR | DUPLEX (LEFT STAPLING) | 2 IN 1 | ABSENCE | TWO POINTS | 3/5(0.6) | N IN 1(2 IN 1): 0.6, STAPLING (TWO POINTS): 0.6 |

- CURRENT SETTING: "COLOR" + "DUPLEX (LEFT STAPLING)" + "ABSENCE OF PUNCHING" + "ABSENCE OF STAPLING"
- HATCHING: [DIFFERENTIAL COMPONENT]:[SETTING VALUE]
- "ACCORDANCE DEGREE" = "NUMBER OF SETTING ITEMS, SETTING VALUES OF WHICH ARE IN ACCORDANCE WITH EACH OTHER" / "NUMBER OF ALL SETTING ITEMS"
  (→BASED ON ACCORDANCE DEGREE, SCORE VALUE IS ATTACHED TO "DIFFERENTIAL COMPONENT" · "SETTING VALUE" FOR EVERY JOB)
- CHANGE CONTENTS = SETTING ITEMS (GROUP OF SETTING ITEMS)

FIG. 11

| CHANGE CONTENTS | CALCULATION (SCORE ADDITION) | TOTAL SCORE |
|---|---|---|
| PUNCHING | 0.8+0.6+0.6+0.4 | 2.4 |
| N IN 1 | 0.2+0.6+0.4+0.6 | 1.8 |
| STAPLING | 0.2+0.6+0.6 | 1.4 |
| PRINTING SURFACE | 0.2+0.6+0.4 | 1.2 |
| PRINTING COLOR | 0.2+0.6 | 0.8 |

INFORMATION PROCESSING APPARATUS

This application is based on Japanese Patent Application No. 2009-143473 filed on Jun. 16, 2009, with Japan Patent Office, the entire content of which is hereby incorporated by reference.

BACKGROUND OF THE INVENTION

The present invention relates to an information processing apparatus in which operations for establishing (inputting) and changing setting values in regard to various kinds of setting items can be performed through a single screen or a plurality of screens.

A certain information processing apparatus, such as a printer, a copier, etc., is provided with a lot of setting items in regard to an apparatus and a job. When performing operations for establishing (inputting) and changing setting values in regard to the lot of setting items through a single screen or a plurality of screens, if a number of setting items to be displayed on the single screen is too large, or various kinds of setting items are displayed over the plurality of screens, sometimes, the user consumes much time to conduct the operations for selecting the setting items and for establishing and changing the setting values in regard to the setting items concerned.

To overcome the abovementioned problem, for instance, Tokkaihei 11-342660 (Japanese Patent Application Laid-Open Publication) sets forth such the technology that investigates the changing history of each of the setting items when the user instruct the printer to display the setting screen, and displays the setting items in descending order of changing frequency so as to make it easy for the user to select the setting item desired.

However, according to the technology set forth by Tokkaihei 11-342660, the setting items are displayed merely in order of the changing frequency in the past. For instance, in such an operation that the user intends to again change some of the setting items after the user has completed the operation for establishing the setting items as a whole in advance, since such the operation is not implemented in the state that none of the setting items have been established, it is impossible to preferentially display the specific setting items to be changed by the user, even if the setting items are preferentially displayed in descending order of changing frequency in the past. Therefore, even if the technology set forth by Tokkaihei 11-342660 is applied to the operation for changing the specific setting items after the operation for establishing the setting items has been completed as a whole, there has been a problem that it is impossible to make it easy for the user to perform the operation for changing the specific setting items.

SUMMARY OF THE INVENTION

To overcome the abovementioned drawbacks in conventional information processing apparatus, it is one of objects of the present invention to provide an information processing apparatus, which makes it possible to easily conduct a setting change operation for a plurality of setting items after the concerned setting operation has been completed.

Accordingly, at least one of the objects of the present invention can be attained by any one of the information processing apparatuses described as follows.

(1) According to an information processing apparatus reflecting an aspect of the present invention, the information processing apparatus, comprises: an operating section to establish a set of setting values corresponding to a plurality of setting items, therefrom; a storage section to store the set of setting values established from the operating section, therein; a display section; and a controlling section to control the display section, wherein, when receiving a request for changing the set of setting values established in advance through the operating section, the controlling section controls the display section so as to display at least one candidate of change contents onto the display section, based on differential components between the set of setting values established in advance and another set of setting values stored in the storage section.

(2) According to another aspect of the present invention, in the information processing apparatus recited in item 1, the storage section stores a changed set of setting values, which has changed from the set of setting values in response to the request for changing, therein, while correlating the changed set of setting values with the set of setting values before change; and the controlling section determines the at least one candidate of change contents, based on the differential components between the set of setting values to be changed in response to the request for changing and a specific changed set of setting values, which is correlated to a specific set of setting values before change, among other sets of setting values stored in the storage section; and wherein setting values included in the specific set of setting values before change coincide with those included in the set of setting values to be changed in response to the request for changing.

(3) According to still another aspect of the present invention, in the information processing apparatus recited in item 1 or item 2, the controlling section conducts weighting operations for every one of setting values extracted as the differential components, so as to display the at least one candidate of change contents onto the display section according to a priority order determined based on a value found by accumulating weights derived from the weighting operations.

(4) According to still another aspect of the present invention, in the information processing apparatus recited in item 3, the controlling section conducts the weighting operations for every one of other sets of setting values, corresponding to a ratio of setting items, setting values of which coincide with setting values included in the set of setting values to be changed in response to the request for changing among the other sets of setting values.

(5) According to still another aspect of the present invention, in the information processing apparatus recited in any one of items 1-4, the setting items includes a group of setting items, which have three or more options of setting values; and, with respect to the group of setting items, the controlling section displays at least two options, among options of setting values excepting setting values in a group of setting items in regard to the set of setting values to be changed in response to the request for changing, as the at least one candidate of change contents onto the display section in a unit of the group of setting items.

(6) According to still another aspect of the present invention, in the information processing apparatus recited in item 5, the controlling section determines a display order of the options serving as the at least one candidate of change contents within a single group of setting items, based on a predetermined priority order.

(7) According to still another aspect of the present invention, in the information processing apparatus recited in any one of items 1-6, the set of setting values is a combination of setting values that specify processing conditions of a job.

(8) According to still another aspect of the present invention, in the information processing apparatus recited in item 7, when receiving a setting change inputted from the operating section with respect to the set of setting values in regard to the job, which is to be changed in response to the request for changing, during an implementation of the job, the controlling section continues the implementation of the job, while reflecting the setting change onto the set of setting values in regard to the job.

(9) According to yet another aspect of the present invention, in the information processing apparatus recited in item 7, when receiving a setting change inputted from the operating section with respect to the set of setting values in regard to the job, which is to be changed in response to the request for changing, during an implementation of the job, the controlling section cancels the job being in mid-course of its implementation, to create a new job including a new set of setting values onto which the setting change is reflected.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 shows an exemplified table indicating a history list of setting contents of a print job, which is stored in a Multi Function Peripheral;

FIG. 3 shows an exemplified table indicating a differential component list of setting contents, corresponding to the history list shown in FIG. 2;

FIG. 4 shows an exemplified scoring table of change contents of settings corresponding to the differential component list shown in FIG. 3;

FIG. 8 shows an exemplified list of differential components of setting contents in a print job in regard to the third embodiment of the present invention;

FIG. 9 shows an exemplary table indicating a list of setting values in regard to a certain group of setting items, in which each of some setting items has plural options of setting values;

FIG. 10 shows an exemplified list of differential components of setting contents in a print job in regard to the fourth embodiment of the present invention;

FIG. 11 shows an exemplary table indicating a scoring table corresponding to the differential component list shown in FIG. 10.

DETAILED DESCRIPTION OF THE PREFERRED EMBODIMENT

Figure 1:
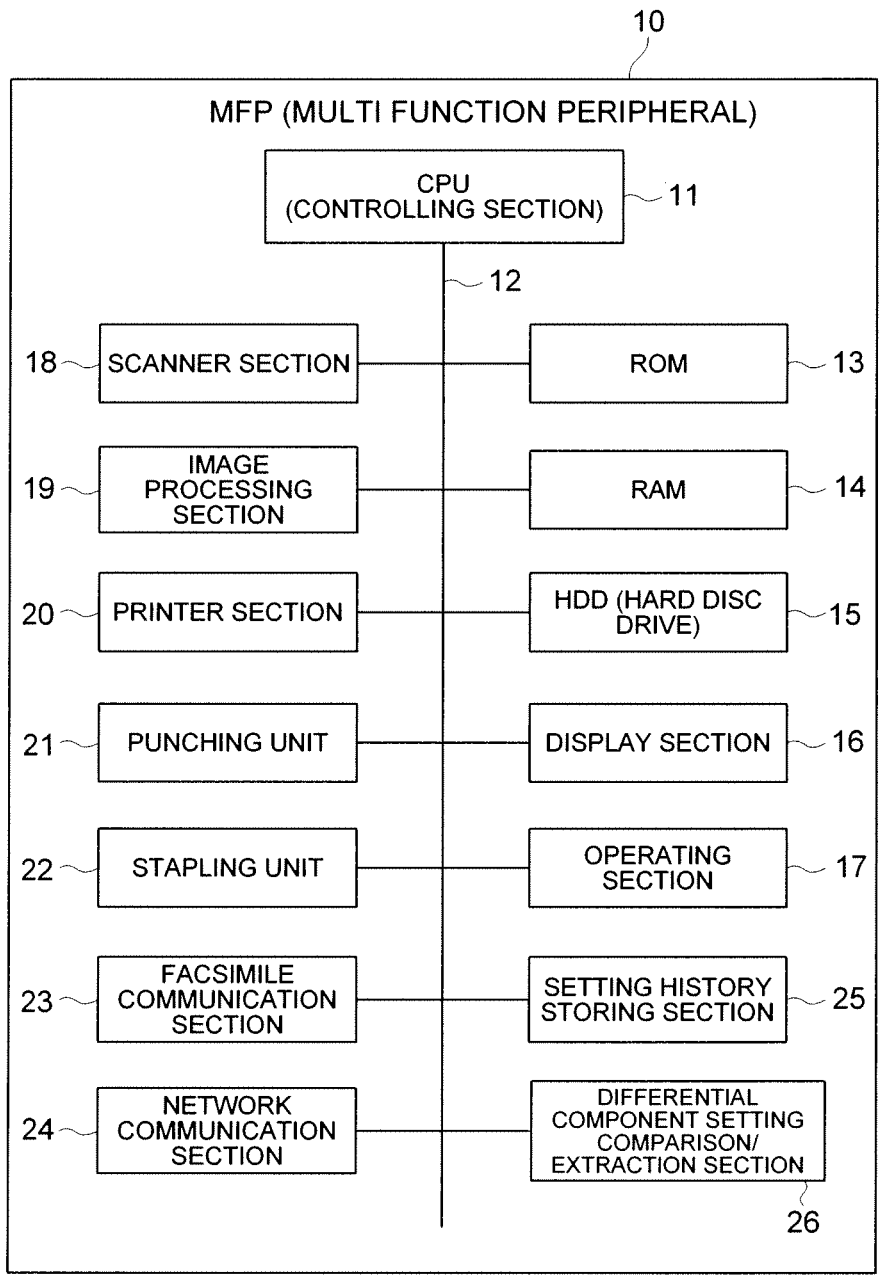
FIG. 1 shows a block diagram indicating a rough configuration of a Multi Function Peripheral, serving as an information processing apparatus embodied in the present invention as the first embodiment.

Referring to the drawings, the embodiments of the present invention will be detailed in the following.

First Embodiment

FIG. 1 shows a block diagram indicating a rough configuration of the MFP (Multi Function Peripheral) 10, serving as an information processing apparatus (also serving as an image processing apparatus) embodied in the present invention as the first embodiment.

The MFP 10 is provided with: a copy function for optically reading a document image so as to print its copy image onto a recording paper sheet and to output the recording paper sheet with the copy image; a scanning function for making a file including the image data representing the document image so as to store the file into a storage, and/or so as to transmit the file to an external terminal device, such as a personal computer, etc.; a printer function for printing an image represented by print data received from an external terminal device, or another image represented by image data stored in the MFP 10 concerned, onto a recording paper sheet so as to output the recording paper sheet with the printed image; a facsimile function for transmitting and receiving the image data; etc.

Further, the MFP 10 is also provided with a post processing function for applying various kinds of post processing to a printed recording paper sheet (or a bunch of printed paper sheets), which is outputted after printed by using any one of the copy function, the printer function, the facsimile function, etc. The various kinds of post processing includes a punch processing for punching the printed recording paper sheet so as to create a punching hole, a staple processing for stapling the bunch of printed paper sheets with a staple, etc.

The jobs to be implemented by the MFP 10 on the basis of the instructions issued by the user, includes a copy job for implementing the printing operation by using the abovementioned copy function, a print job for implementing the printing operation by using the abovementioned printer function, etc. Further, with respect to such the job that implements the printing operation, the post processing would be also applied to the paper sheets printed, as needed. When the user intends to implement the copy job and/or the print job in regard to the image data stored in the MFP 10, and in addition, the user also wishes to apply the post processing the printed paper sheets concerned, the user operates the MFP 10 so as to establish the setting items of the job and to issue an instruction for implementing the job concerned.

Hereinafter in the present specification, the abovementioned job that includes a printing operation is defined as the "print job" as its general term. The print job is constituted by image data, a processing condition (processing command), etc. The processing condition is specified by a set of setting values defined as such a plurality of setting values that corresponds to a plurality of setting items.

The setting items in regard to the print job (including the post processing) include a printing surface, a printing color, a punch processing, a staple processing, etc. The setting values corresponding to the setting items abovementioned are "one side printing or duplex printing" corresponding to the printing surface, "presence or absence of punching" corresponding to the punch processing, "presence or absence of stapling" corresponding to the staple processing, etc.

Further, sometimes, other items, including an integration printing (N-in-1) in which the printing operation is performed by integrating plural pages into one page, a printing size, a resolution, etc., are established as the setting items. The setting value corresponding to the integration printing is "absence of N-in-1 (1 in 1), 2 in 1 or etc.", the setting value corresponding to the printing size is "A4, A3 or etc." and the setting value corresponding to the resolution is "300 dpi (dot per inch), 600 dpi or etc." The set of setting values is constituted by a combination of the plurality of setting values corresponding to the setting items concerned.

In addition to the above, the MFP 10 is also provided with a function for displaying the abovementioned setting items onto the setting screen of the print job (copy job or print job) so as to accept the setting operations conducted by the user and another function for storing the set of setting values for which the operation for completing the setting operations is accepted. In the setting function and the storing function, abovementioned, with respect to the setting item for which the setting operation is conducted by the user, the setting value established by the setting operation concerned is stored as it is, while, with respect to the setting item for which the setting operation is not conducted by the user, the initial setting value is established and stored as the default setting value.

Further, the MFP 10 is also provided with a function for displaying the setting item change screen, at the time when accepting a change request operation after the setting operation is completed or in mid-course of implementing the print job concerned, so as to accept the setting item changing operation to be conducted by the user, and another function for displaying candidates of change contents onto the setting item change screen on the basis of differential components between the currently objective set of setting values and the other set of setting values stored in advance when accepting the change request operation.

As shown in FIG. 1, the MFP 10 is constituted by a CPU (Central Processing Unit) 11 serving as a controlling section, a ROM (Read Only Memory) 13, a RAM (Random Access Memory) 14, an HDD (Hard Disc Drive) 15, a display section 16, an operating section 17, a scanner section 18, an image processing section 19, a printer section 20, a punching unit 21, a stapling unit 22, a facsimile communication section 23, a network communication section 24, a setting history storing section 25 and a differential component setting comparison/extraction section 26, which are coupled to each other through a bus 12.

The CPU 11 controls operations and actions to be performed in the MFP 10 by executing various kinds of programs stored in the ROM 13. The RAM 14 not only serves as the working memory into which various kinds of data are temporarily stored when the CPU 11 executes a program, but also serves as an image data storage into which various kinds of image data are temporarily stored. The HDD 15 stores not only various kinds of archive data sets therein, but also image data acquired by reading a document in the document scanning operation and the copying operation, print data (image data) included in the print job instructed by the external terminal device, etc.

The display section 16 is constituted by a LCD (Liquid Crystal Display), etc., so as to display various kinds of screens, such as an operating screen, a setting screen, a setting item change screen, a guidance screen, etc. The operating section 17 is constituted by various kinds of operating buttons, such as a mode selecting button, a start button, a stop button, a cancel button, a setting change button, a ten-key numeric keypad, etc., and a touch panel mounted over the surface of the LCD to detect a coordinate position of a depressed point, etc., so as to accept various kinds of operations to be conducted on the MFP 10 by the user.

The scanner section 18 optically reads a document image so as to acquire image data representing the document image. For instance, the scanner section 18 is constituted by: a light source to emit light to be irradiated onto the document; a line image sensor to receive the light reflected from the document so as to read the document image for every one scanning line in a width direction; a document shilling mechanism to sequentially shift the reading position of the document in a unit of one scanning line in its length direction; an optical path that is constituted by various kinds of optical elements, such as a lens, a mirror, etc., to guide and focus the light reflected from the document onto the line image sensor; an analogue to digital converting section to convert the analogue image signals, outputted by the line image sensor, to digital image data; etc.

The image processing section 19 applies various kinds of image processing, such as an image correction processing, an image rotation processing, a size enlargement/reduction processing, an compression/expansion processing, etc., to the digital image data.

The printer section 20 forms an image based on the image data onto the recording paper sheet through the electro-photographic process and outputs the recording paper sheet with the image. Further, the printer section 20 is also provided with a duplex printing function, a color printing function, etc. For instance, the printer section 20 is constituted by: a conveyance section to convey a recording paper sheet; a photoreceptor drum; a charging device; an LD (Laser Diode) to emit a laser beam, intensity of which is modulated and controlled according to the image data inputted; a scanning unit to scan the laser beam emitted from the LD on the circumferential surface of the photoreceptor drum; a developing device; a transferring and separating device; a cleaning device and a fixing device; so that the printer section 20 serves as a color laser printer. Other than the LED (Light Emitting Diode) printer in which the photoreceptor drum is irradiated by light emitted from the LED assembly, instead of the laser beam, any kind of a printer employing another method is also applicable in the present invention.

The punching unit 21 forms a punching hole onto the recording paper sheet printed and outputted by the printer section 20. The stapling unit 22 staples the recording paper sheets printed and outputted by the printer section 20 (bunch of printed paper sheets) with the staple.

The facsimile communication section 23 communicates with an external device provided with a facsimile function through a public telephone line system. The network communication section 24 communicates with an external device, etc., through a network, such as a LAN (Local Area Network), etc.

The setting history storing section 25 is constituted by a nonvolatile storage, etc., so as to store the setting history information of the job (set of setting values, as shown in FIG. 2), which is established by operating the operating section 17 through the setting screens displayed on the display section 16, etc., therein.

Receiving the operation for changing the setting values of the job concerned, the differential component setting comparison/extraction section 26 compares the current setting values of the concerned job with setting history of the other job (setting values of history side) stored in the setting history storing section 25, so as to extract the differential components, as shown in FIG. 3. The operation for changing the setting values is any one of an operation for depressing a setting value change button, an operation for depressing a cancel button, etc. Further, hereinafter, the term of "differential component" is defined as a difference between a current setting value and a setting value of history side.

Based on the differential components extracted by the differential component setting comparison/extraction section 26, the CPU 11 displays candidates of setting change contents onto the setting item change screen. The candidates of change contents include the setting values of the changing candidates and the setting items of the changing candidates (gropes of setting items).

Figure 5:
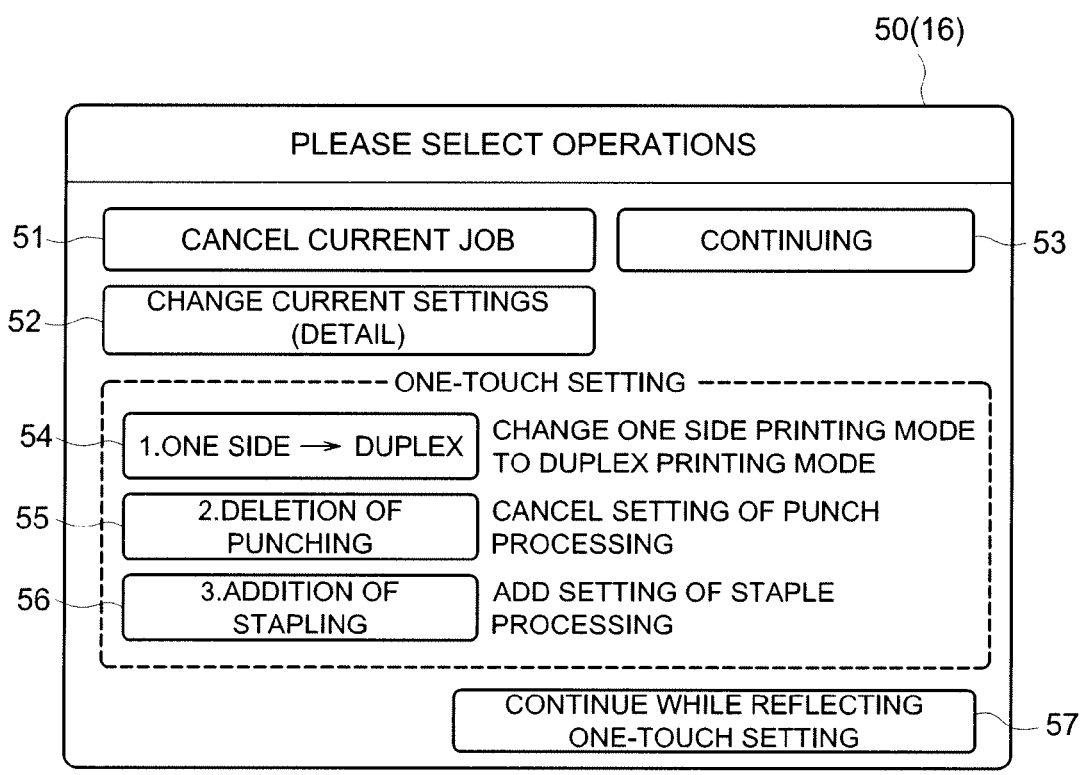
FIG. 5 shows an example of a setting item change screen to be displayed on a display section by a Multi Function Peripheral, based on the scoring table shown in FIG. 4.

Further, the CPU 11 gives a weight to each of the setting values extracted as the differential components, so as to display the candidates of change contents onto the setting item change screen in such a priority order that is determined on the basis of a value derived by accumulating the weights for each of the setting contents (refer to FIG. 5). Still further, during the abovementioned process, the CPU 11 creates a differential component list (refer to FIG. 3) in which weighting (scoring) information corresponding to each of the differential components is stored, and a scoring table (refer to FIG. 4) in which an accumulated value of the weights is stored for every change content. In this connection, it is also applicable that the differential component setting comparison/extraction section 26 creates the differential component list and the scoring table, both abovementioned, instead of the CPU 11.

Still further, the CPU 11 conducts the abovementioned weighting operation, corresponding to a rate of setting items whose setting values coincide with those of the set of setting values that has received the change request among the sets of setting values in regard to the past print job, for every one of those sets of setting values. Hereinafter, the abovementioned rate is called "Accordance degree". The above-defined "Accordance degree" indicates a degree of accordance (similarity) between the setting contents of the current print job that has received the change request (current settings) and the other setting contents of the past print job (settings in the history side), and is defined by Equation (1) indicated as follow.

"Accordance degree"="Number of setting items, setting values of which are in accordance with each other"/"number of all setting items" (1)

Further, hereinafter, a print job being currently implemented is also referred to as a "current job", while another job completed in the past is also referred to as a "past job".

FIG. 2 shows an exemplified table indicating a history list 30 of the setting value set (setting contents) of the print job, which is stored in the setting history storing section 25 of the MFP 10 as the setting history information. In this embodiment, such the case that the setting items include a printing surface, a printing color, a punch processing and a staple processing, is exemplified in the following explanations.

For instance, the setting value set including four setting values ("user setting"/"initial setting") corresponding to the abovementioned four setting items displayed on the setting screen of the print job ("copy job"/"print job") is stored into the history list 30 for every job, when an instruction for instructing a completion of the setting operation is received. The completion of the setting operation is instructed by depressing the start button for instructing the implementation of the job concerned, depressing the fix button displayed on the setting screen, or the like.

In the present embodiment, the sets of setting values of the 10 print jobs corresponding to the job IDs (Identification) 1 through 10 are stored into the history list 30 as the history. For instance, the set of setting values corresponding to the job ID 1 is indicated as a combination of ["color"+"duplex"+"absence of punching"+"absence of stapling"]. The other sets of setting values of the other print jobs corresponding to the job IDs 2 through 10 are indicated as combinations shown in FIG. 2.

FIG. 3 shows an exemplified table indicating a differential component list 35 created on the basis of the history list 30 shown in FIG. 2. In FIG. 3, the history list 30 is also indicated, so as to make the history list 30 and the differential component list 35 correspond to each other.

When the differential component list 35 is created, for every one of the past jobs stored in the history list 30, the set of setting values of the past job is compared with the concerned set of setting values of the current job at first, so as to extract differential components of the setting values. For instance, when the concerned set of setting values of the current job is established as the combination of ["color"+"one side"+"presence of punching"+"absence of stapling"], the setting values of the differential components extracted with respect to the past jobs corresponding to the job ID 1 through 10, are indicated by hatching the setting values concerned.

The "Accordance degree" of the set of setting values of the past job corresponding to the set of setting values of the current job is found for every past job by employing the Equation (1) aforementioned, and then, is stored into the differential component list 35 for every past job, while correlating it with the job ID. Further, depending on the "Accordance degree", the operation for weighting (scoring) is applied to the setting value of the differential component (change contents) for every past job so as to store the concerned information for every past job, while correlating it with the job ID.

The "change contents" represent not only the contents of the settings to be changed (setting value/setting item), but also a unit by which the priority order of the concerned contents to be displayed on the screen (setting item change screen) is defined. For instance, when a unit of setting value is established, the setting value is defined as the change content, while, when a unit of setting item is established, the setting item is defined as the change content. In the present embodiment, "change content=setting value" is established. In this connection, the case of "change content=setting value" will be detailed in the first-third embodiments, while the case of "change content=setting item" will be detailed in the fourth embodiment.

The weighting operation is performed so as to determine the priority order of the concerned contents. Herein, based on such considerations that it would be highly possible that the setting contents of the current job under the change request will be changed so as to make them coincide with the past setting contents having a high "Accordance degree" (similarity) (or having a small amount of differential component), the higher the "Accordance degree" of the past job is, the heavier the setting values of differential components (setting contents) is weighted (high score is given). For this purpose, the "Accordance degree" is employed for weighting. Further, herein, both such a past job whose "Accordance degree" is zero (0%) due to no accordance of the setting values and such another job whose "Accordance degree" is 1 (100%) due to no differential component of the setting values, are exempted from the weighting operation.

For instance, with respect to the past job corresponding to job ID 1, the setting values of the differential components in regard to the current job are two values of "duplex" and "absence of punching". Accordingly, the "Accordance degree" of [2/4] (=0.5), derived by dividing a number of setting items for which the setting values coincide with each other: 2 by a number of all setting items constituting the set of setting values concerned: 4, is stored. Further, as the weighting information, information of [one side→duplex] and [punch deletion] respectively attached with the scoring of "0.5" are stored.

Although the detailed explanations in regard to the other past jobs will be omitted, in the present embodiment, the past job corresponding to job ID 5 whose "Accordance degree" is 0 ("0/4") and the past job corresponding to job ID 6 whose "Accordance degree" is 1 ("4/4") are exempted from the scoring operation. With respect to each of the past jobs corresponding to job IDs 2 through 4 and job IDs 7 through 10, the information, acquired by applying the scoring operation using the "Accordance degree" to the setting value of the differential component (change contents), is stored. Concretely speaking, with respect to the setting value of the differential component of the past job whose "Accordance degree" is "1/4", the information attached with the scoring value of 0.25 is stored, and with respect to the setting value of the differential component of the past job whose "Accordance degree" is "2/4", the information attached with the scoring value of 0.5 is stored, and with respect to the setting value of the differential component of the past job whose "Accordance degree" is "3/4", the information attached with the scoring value of 0.75 is stored.

FIG. 4 shows an example of a scoring table 40 created on the basis of the differential component list 35 shown in FIG. 3. The scoring table 40 stores: information indicating kinds of change contents in the differential component list 35; calculation information indicating the scoring values to be accumulated, which are respectively attached to the setting values of the differential component in the differential component list 35, for each of the kinds of change contents; and total scoring information (accumulated values), therein, while correlating them with each other. The priority order is attached to each of the change contents in order of the scoring values, the highest fast.

In this example, four kinds of change contents, including [one side duplex], [punch deletion], [staple addition] and [color→monochrome], are aligned in this high-to-low order of the scoring values, and the priority order is attached to each of the four kinds of change contents in the abovementioned order. Further, in the scoring table 40 of this example, the information of the change contents are stored by aligning them from upper to lower in order of the total scoring values (priority order), the highest uppermost.

FIG. 5 shows an example of a setting item change screen 50 displayed on the display section 16, based on the scoring table 40 shown in FIG. 4.

As shown in FIG. 5, the setting item change screen 50 includes a job cancel button 51 to accept a cancellation of the current job (print job currently implemented), a setting detail change button 52 to accept a change of the detailed setting in the current job, a job continuation button 53 to accept a continuation of the current job, one-touch setting buttons 54, 55 and 56 to accept a one-touch change of the setting of the current job and a one-touch setting settlement button 57 to accept a settlement of the setting change selected by depressing one of the one-touch setting buttons 54, 55 and 56 (continuation while reflecting the one-touch setting change to the setting of the current job).

In this connection, for instance, with respect to the setting detail change button 52, it is also applicable that, when the setting detail change button 52 is depressed, the current screen is changed to the normal setting screen, so as to make it possible to accept an operation for changing any kind of setting value included in all of the setting items, or the like.

In this example, with respect to the one-touch setting buttons 54, 55 and 56, the three buttons corresponding to the three change contents from the highest rank in the scoring table 40, including the one-touch setting button 54 for [one side→duplex], the one-touch setting button 55 for [punch deletion] and the one-touch setting button 56 for [staple addition], are displayed by aligning them from upper to lower in the above order according to the priority order, the highest uppermost. It is possible to select a plurality of change contents by depressing the corresponding one-touch setting buttons at a time, unless the plurality of change contents includes an exclusive combination of processing.

Since this example does not include any exclusive combination of processing, it is possible for the user to select any two or all of the three change contents by depressing the corresponding one-touch setting buttons at a time.

In this connection, the number of change contents to be displayed as the one-touch setting buttons is not limited to uppermost three items. For instance, it is applicable that a arbitral number of one-touch setting buttons, which is determined as needed depending on the various kinds of conditions, such as a number of change contents, a size of the one-touch setting button, a size of a button display area to be provided in the setting item change screen 50, etc., are displayed.

After any one or any plural ones of the one-touch setting buttons, displayed on the setting item change screen 50, is/are depressed so as to select the desired change contents, by depressing the one-touch setting settlement button 57, the abovementioned selection of the desired change contents is fixedly settled. Then, the selected change contents are reflected onto the setting values of the current job, so that the implementation of the current job is continued according to the revised setting values.

Next, the operations to be conducted by the MFP 10 will be detailed in the following.

Figure 6:
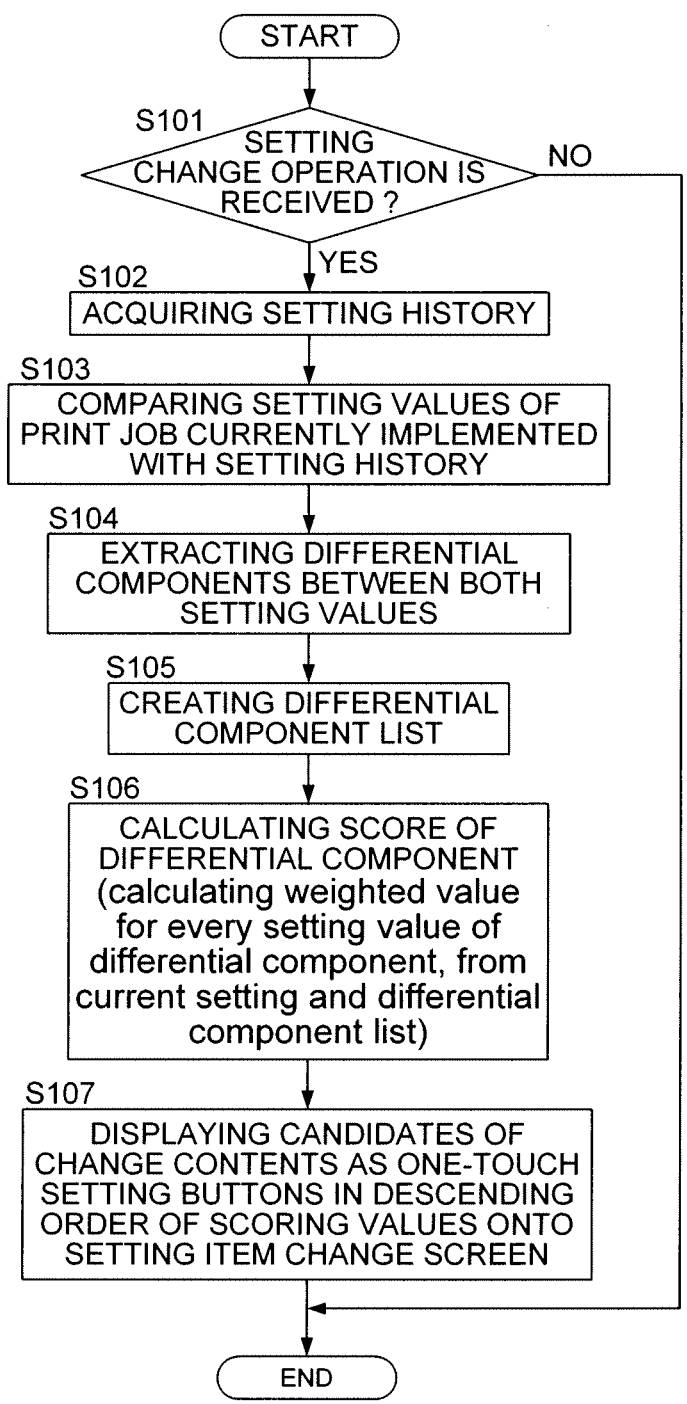
FIG. 6 shows a flowchart indicating a flow of a setting change operation of a print job to be conducted by a Multi Function Peripheral embodied in the present invention as the first embodiment.

FIG. 6 shows a flowchart indicating a flow of the setting change operation of the print job to be conducted by the MFP 10. Although the setting change operation to be conducted in mid course of implementing the print job will be detailed in the following, the other setting change operation, to be conducted after the operation for setting the print job is completed and before the print job is actually implemented, is fundamentally operated in the same manner. Further, it is applicable that the MFP 10 is so constituted that, during the time when the setting item change screen is displayed in response to the setting change operation, the print job currently implementing is halted, or is continued without halting.

When determining that none of the setting change operation is received during the time when the print job is implemented (Step S101; No), the CPU 11 equipped in the MFP 10 finalizes the flow of the setting change operation at the time when the implementation of the print job concerned is completed (END). When the CPU 11 determines that the setting change operation is received during the time when the print job is implemented (Step S101; Yes), the differential component setting comparison/extraction section 26 acquires the setting history (refer to the history list shown in FIG. 2) stored in the setting history storing section 25 (Step S102), and then, compares the setting values of the print job currently implemented and the setting history with each other (Step S103), so as to extract the differential components between them (Step S104).

Receiving the extracted differential components, the CPU 11 creates the differential component list (Step S105, refer to FIG. 3), and then, creates the scoring table (Step S106, refer to FIG. 4). Successively, the CPU 11 displays the candidates of the change contents as the one-touch setting buttons in descending order of scoring values (in priority order, the highest fast) onto the setting item change screen (Step S107, refer to FIG. 5), and then, finalizes this flow of the setting change operation (END).

In Step S107 abovementioned, for instance, the CPU 11 displays the setting item change screen 50 shown in FIG. 5 on the display section 16 of the MFP 10. Through the setting item change screen 50, it is possible for the user to apply various kinds of operations to the print job currently implemented, such as an operation for canceling the print job by depressing the job cancel button 51, an operation for continuing the current setting as it is by depressing the job continuation button 53, an operation for changing detail of the current setting by depressing the setting detail change button 52, an operation for changing the current setting with one touch action by depressing any one or any plural ones of the one-touch setting buttons 54, 55 and 56 and by depressing the one-touch setting settlement button 57, and an operation for selecting the continuation of the print job to which the above-changed contents are reflected.

In this connection, although the MFP 10, serving as a present embodiment, is so constituted that, when the setting change instructed by one touch action is received, the setting change is reflected to the print job currently implemented, it is also applicable that the print job currently implemented is cancelled, and a new print job, to which the setting change is reflected, is created and implemented. Further, it is also applicable that the MFP 10 is so constituted that the user can select any one of the two operating modes abovementioned.

As described in the above, according to the MFP 10 embodied in the present invention, when the MFP 10 receives the setting change operation after the operation for setting the print job is completed (in mid-course of implementing the print job concerned), the MFP 10 displays the one-touch setting buttons (corresponding to the candidates of the change contents) for receiving the setting change in regard to the current print job onto the setting item change screen, based on the differential components between the setting contents (set of setting values) of the current print job concerned and the other setting contents of the past print job, which are stored in the history list 30. Concretely speaking, the MFP 10 conducts such the controlling operations that the weighting operation is applied to each of the setting values (setting contents) extracted as the differential components, based on the "Accordance degree" of the setting contents, so as to determine the priority degree of the setting contents, and then, the one-touch setting buttons corresponding to the candidates of the change contents are displayed onto the setting item change screen in order of the priority degree, the highest fast.

Since the setting change is conducted on the basis of the differential components after the setting operation is completed, as abovementioned, it becomes possible to preferentially display the candidate of the change contents having a high changing possibility. Specifically, in the present embodiment, the higher the "Accordance degree" (similarity) between the current setting content and the past setting content is, the higher the priority order for displaying the one-touch setting button to change the current setting content to the past setting content (candidate of the change content concerned) becomes, so that the candidate of the change content having a high changing possibility is preferentially displayed on the setting item change screen. Accordingly, it becomes possible for the user to easily conduct the setting change operation.

Further, according to the setting change operation to be performed in the present invention as described in FIG. 6, since the weighting value of the change content is calculated after the setting change operation has been received, no wasted processing is required, compared to such a case that the concerned calculation is commenced before the setting change operation is received.

Second Embodiment

Figure 7:
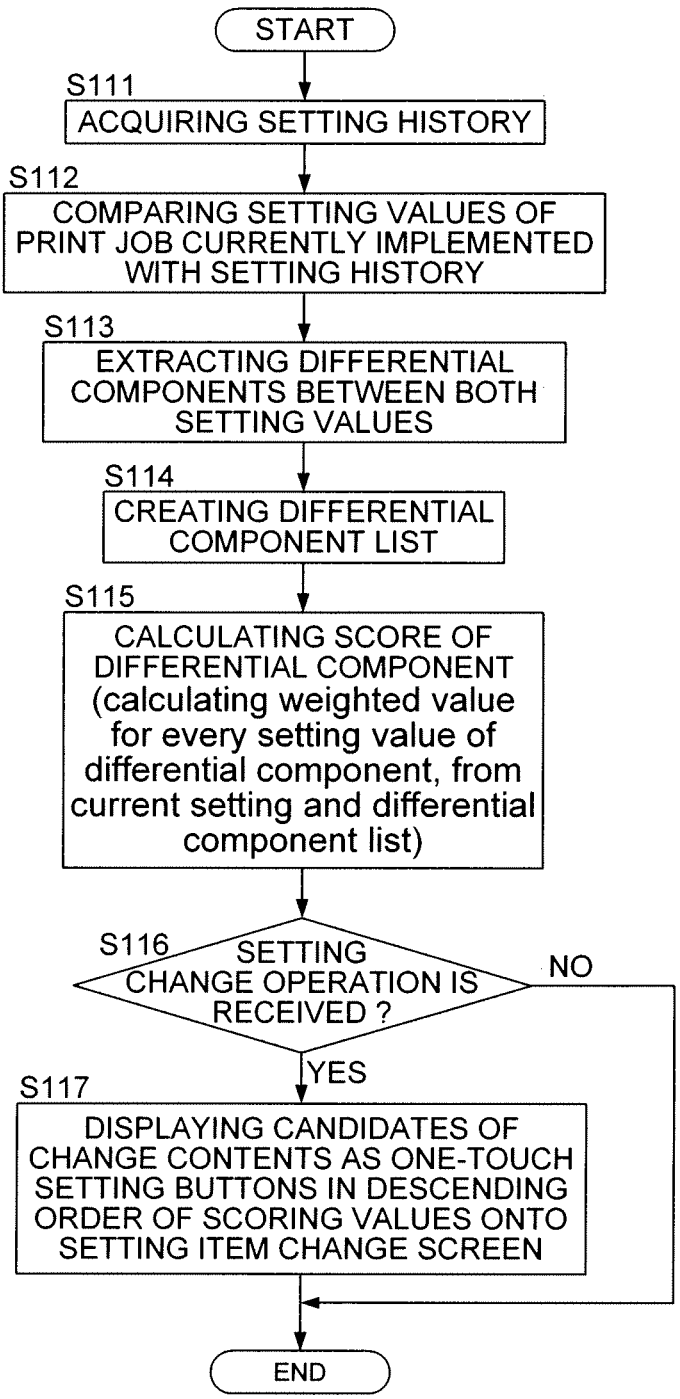
FIG. 7 shows a flowchart indicating a flow of a setting change operation of a print job to be conducted by a Multi Function Peripheral embodied in the present invention as the second embodiment.

FIG. 7 shows a flowchart indicating a flow of the setting change operation of the print job to be conducted by the MFP 10 embodied in the present invention as the second embodiment. In the second embodiment, a weighted value of the change contents is calculated at the time when the operation for implementing the print job is commenced.

Concretely speaking, after the CPU 11 of the MFP 10 has completed the operations in Step S111 through Step S115, which are same as those in Step S102 through Step S106 indicated in the flowchart shown in FIG. 6, the CPU 11 conducts the operation in Step S116, which is same as that in Step S101 indicated in the flowchart shown in FIG. 6. When determining that none of the setting change operations are received in mid course of implementing the print job (Step S116; No), the CPU 11 resets the calculation results derived from the operations in Step S111 through Step S115 and finalizes this operational flow at the time when the implementation of the print job concerned is completed (END).

The abovementioned procedure is also applicable for conducting the setting change operation. Further, according to the second embodiment, since, irrespective of whether or not the setting change operation is received, the CPU 11 commences the operation for calculating the weighted value of the change contents, it becomes possible to speedily change the current screen to the setting item change screen in which the candidates of the change contents (one-touch setting buttons) are displayed, immediately after the setting change operation is received in mid course of implement the print job concerned.

Third Embodiment

FIG. 8 shows an example of a history list 60 embodied in the present invention as the third embodiment. In the third embodiment, the set of setting values (setting contents) of the print job, which has been changed on the basis of the setting change received, are stored into the history list 60 while correlating them with those before changed. Further, the candidates of the change contents to be displayed on the setting item change screen is determined on the basis of the differential components between the set of the setting values of the print job that receives the change request, and the set of setting values after changed, which are correlated with the set of setting values before change and for which the set of setting values receiving the change request and the all of the setting values coincide with each other among the sets of the setting values of the past print job stored in the history list 60.

Concretely speaking, the fifteen sets of setting values of the print jobs corresponding to job IDs 1 through 15 are stored in the history list 60. In the area corresponding to each of job IDs 1 through 15, the set of initial setting values before changed are indicated on the upper line, while the set of changed setting values after changed are indicated on the lower line, and each of the changed setting values is indicated by hatching it. Further, with respect to the print job for which no setting change is applied, the set of setting values is indicated by filling the symbols of "*" on its lower line.

In the third embodiment, for instance, when the set of setting values (setting contents) of the current print job is

["color"+"one side"+"presence of punching"+"absence of stapling"] as well as in the first embodiment, among the past print jobs stored in the history list 60, the past print job in which all of the setting values of the set of the setting values before changed coincide with respect to the set of setting values at present and to which the setting change operation is applied, is regarded as an object of the scoring calculation (weighting) of the setting contents. In the history list 60 shown in FIG. 8, the print job to be regarded as the object of the scoring calculation is indicated by a symbol "A", while the print job not to be regarded as the object of the scoring calculation is indicated by a symbol "B".

In this example shown in FIG. 8, the eight print jobs, respectively corresponding to job ID 1, job ID 3, job ID 4, job ID 6, job ID 10, job ID 12, job ID 13 and job ID 15, can be selected as the object of the scoring calculation. In this connection, the set of changed setting values of each job to be regarded as the object of the scoring calculation is made to correspond to each of the sets of the setting values of job IDs 1 through 4 and job IDs 7 through 10 so as to indicate them as the same sets of setting values.

With respect to each of the eight print jobs selected as the object of the scoring calculation, the "Accordance degree" between the set of changed setting values and the set of setting values of the current print job is found and the scoring operation in regard to the setting values of the differential component (change contents) so as to store the each of the information into the differential component list. This differential component list is equivalent to that created by subtracting the information of job ID 5 and job ID 6 from the differential component list 35 shown in FIG. 3. Accordingly, the scoring table based on the differential component list of the third embodiment becomes same as the scoring table 40 shown in FIG. 4, and the setting item change screen based on this scoring table becomes same as the setting item change screen 50 shown in FIG. 5.

As described in the above, in the third embodiment, with respect to the set of setting values for which the set of setting values that received change request is same as the setting contents before changed, the change contents changed in the past are extracted as the differential components, and then, based on this differential components, the candidates of the change contents are determined so as to preferentially display them on the setting item change screen. Concretely speaking, with respect to the setting values (setting contents) changed in the same set of setting values in the past, the weighting operation is conducted by employing the "Accordance degree" of the set of setting values after changed so as to determine the priority degree of each of the setting contents based on the value derived by accumulating the weighting values for every setting content. Successively, the one-touch setting buttons, representing the candidates of the change contents concerned, are displayed on the setting item change screen in order of the priority degree, the highest fast.

According to the abovementioned procedure, it becomes possible to appropriately derive the change contents, which have a high possibility to be changed for the set of setting values that received the change request, from the change history in the past, so as to establish the derived change contents as the candidates to be displayed.

Fourth Embodiment

In the first embodiment through the third embodiment, it has been described such the case that two setting values are provided in regard to a single setting item so as to select and establish any one of the two setting values (choice between the two). Successively, in the forth embodiment, it will be described such a case that three or more setting values (options) are provided in regard to a single setting item so as to select and establish any one of the three or more setting values. Further, in the first embodiment through the third embodiment, it has been described such the case that the change contents are the setting values. Successively, in the forth embodiment, it will be described such a case that the change contents are the setting items (group of setting items).

With respect to the setting item in the print job (including post processing) to be conducted in the Multi Function Peripheral, such as a printing surface, an integration printing (N-in-1), a punch processing, a staple processing, etc., sometimes, three or more options are provided in regard to a single setting item. FIG. 9 shows an exemplary table indicating a list of setting values in regard to a certain group of setting items, in which each of some setting items has three or more options of setting values. In this connection, the aforementioned setting item of the printing color, any one of the setting values of which is to be selected in choice between the two, will be also included in the group of setting items for descriptive purpose in the following descriptions.

As shown in FIG. 9, the setting values (options) in the group of setting items include: monochrome/color, in regard to the printing color; one side printing/duplex printing (left side stapling)/duplex printing (upper side stapling), in regard to the printing surface; absence of N in 1 (1 in 1)/2 in 1/4 in 1, in regard to the N-in-1 printing (integration printing); absence of punching/two holes/three holes/four holes, in regard to the punch processing; absence of stapling/left corner/two positions, in regard to the staple processing.

FIG. 10 shows an exemplary table indicating a history list 70 and a differential component list 75, embodied in the present invention as the fourth embodiment.

In the fourth embodiment, the seven sets of setting values (setting contents) of seven print jobs corresponding to job IDs 1 through 7 are stored in the history list 70 as the history. For instance, the set of setting values, in regard to the print job corresponding to job ID 1, is established as ["color"+"duplex printing (left side stapling)"+"absence of Nin1 (1in1)"+"two punching holes"+"absence of stapling"]. Further, the sets of setting values of the other print jobs are established as shown in FIG. 10.

In contrast to the above, when the set of setting values of the current print job that received the change request is established as ["color"+"duplex printing (left side stapling)"+"absence of Nin1 (1in1)"+"absence of punching"+"absence of stapling"], the setting values of the differential components, extracted in regard to the past print job corresponding to job ID 1 through 7, are indicated by hatching the setting values concerned.

In the fourth embodiment, only the setting value that perfectly coincides with the current setting value is determined as one having no differential component, and the other setting values are extracted as the differential components. For instance, with respect to the printing surface, the N-in-1 processing, the punch processing and the staple processing, even if both the current setting value and the past setting value make the concerned processing effective, the concerned setting value is extracted as the differential component, unless the contents of both the processing perfectly coincide with each other.

Concretely speaking, in the case of the punch processing, when the current setting value is established as "absence of punching", each of the past setting values of "two holes", "three holes" and "four holes" is extracted as the differential component. Further, when the current setting value is established as "two holes" (concerned processing: effective), as well as "absence of punching", each of "three holes" and "four holes", serving as the other options for the concerned processing, is extracted as the differential component. With respect to the other groups of the setting items, the setting values of differential components are extracted on the basis of the criteria (regulations) same as abovementioned.

Even in the differential component list to be employed in the fourth embodiment, the "Accordance degree" is found by employing the method same as that employed in the first embodiment, and the weighting operation using the "Accordance degree" is conducted in the method same as that employed in the first embodiment (giving a weight to the setting value of differential component for every past job, corresponding to the "Accordance degree"). However, in the fourth embodiment, the setting contents is made to be a unit of the group of the setting items, and the operation for accumulating the weights, which are given for every setting value of differential component, is separately conducted for each of the groups of the setting items (each of the change contents).

The "Accordance degrees", which are found for every print job, and the results of conducting the weighting operation for every setting value of differential component, in regard to the past jobs corresponding to job IDs 1 through 7 in the history list 70, are indicated in the differential component list 75 shown in FIG. 10. In this differential component list 75, the setting value of differential component to be weighted is indicated by the group of the setting items (change contents) to which the setting value of differential component concerned belongs.

For instance, in regard to the punch processing, the current setting value is established as "absence of punching", and the change contents corresponding to "two holes" and "four holes" (if "three holes" is included in the history list, it is also included), which are extracted as the differential components from the setting history, are indicated as "punching", serving as a name of the group of setting items. As well as the above, with respect to the other groups of setting items, the change contents corresponding to the setting values, extracted as the differential components from the setting history, are indicated by a name of the group of setting items.

FIG. 11 shows an exemplary table indicating a scoring table 80 created on the basis of the differential component list 75 shown in FIG. 10. The scoring table 80 to be used in the fourth embodiment is fundamentally created by employing the method same as that employed in the first embodiment. In this example of the fourth embodiment, the five kinds of change contents (group of setting items) including "punching", "N-in-1", "stapling", "printing surface" and "printing color", are scored in the above order, the highest fast, and the priority orders are attached to them according to this descending order.

Figure 12:
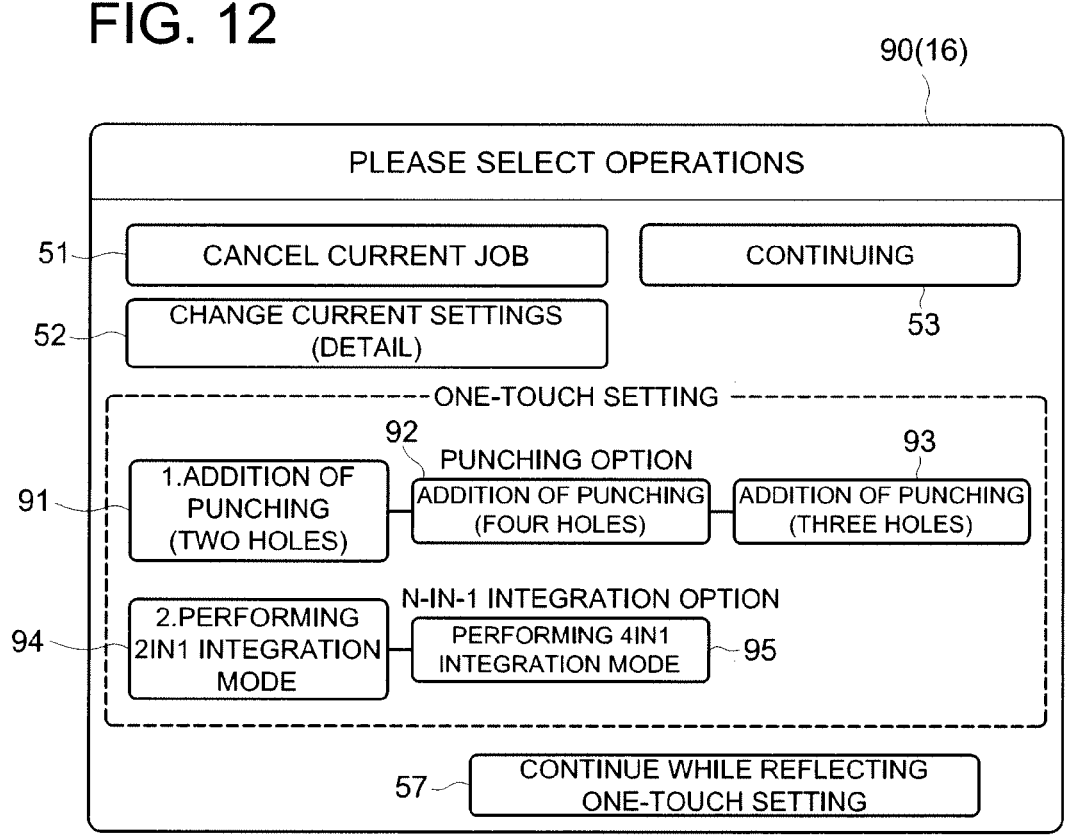
FIG. 12 shows an exemplary screen indicating a setting item change screen to be displayed on the display section 16 by a Multi Function Peripheral, based on the scoring table shown in FIG. 11.

FIG. 12 shows an exemplary screen indicating a setting item change screen 90 displayed on the display section 16, based on the scoring table 80 shown in FIG. 11.

Within the setting item change screen 90, the job cancel button 51, the setting detail change button 52, the job continuation button 53, the one-touch setting settlement button 57, which are described in the first embodiment, and a plurality of one-touch setting buttons 91 through 95, are displayed.

In the example shown in FIG. 12, with respect to the one-touch setting buttons, plural kinds of one-touch setting buttons, each of which corresponds to each of the setting values in two groups of setting items corresponding to the two change contents ranked in top two in the scoring table 80, are displayed integrally in a unit of group. In this connection, within a single group of setting items, for instance, only such one-touch setting buttons that correspond to the residual setting values excepting the setting values at present (current setting values), or only such one-touch setting buttons that correspond to the setting values extracted as the differential components from the setting history, etc., are displayed.

Further, within a single group of setting items, the plural kinds of one-touch setting buttons are displayed according to a predetermined priority order. Herein, the predetermined priority order is defined as an order of times (frequency) of setting operations in the setting history, the highest fast. In this connection, other than the abovementioned definition for the predetermined priority order, it is also applicable that the predetermined priority order is determined on the basis of a value derived by accumulating the scored values for every setting value of differential component within the group of setting items, or defined as a certain fixed order.

In the fourth embodiment, the one-touch setting buttons corresponding to the three residual setting values excepting the current setting value ("absence of punching") in "punching" (group of punch processing) ranked at a top of the priority order, and the other one-touch setting buttons corresponding to the two residual setting values excepting the current setting value ("absence of N-in-1") in "N-in-1" (group of N-in-1) ranked at a second place of the priority order, are respectively integrated for every group, and are displayed according to the priority order of the groups of the setting items (change contents) on the concerned screen by arranging them from top to bottom in that order.

With respect to the group of punch processing, the one-touch setting button 91 for adding two punched holes, the other one-touch setting button 92 for adding four punched holes and still the other one-touch setting button 93 for adding three punched holes, are displayed by aligning them from left to right in order of the times of setting operations, the greatest fast. Further, the size of the one-touch setting button 91 for adding two punched holes is made to be large, compared to that of the other two, so as to make it distinguishable from the other two one-touch setting buttons.

With respect to the group of N-in-1, the one-touch setting button 94 for 2-in-1 and the other one-touch setting button 95 for 2-in-1 are displayed by aligning them from left to right in order of the times of setting operations, the greatest fast. Further, the size of the one-touch setting button 94 for 2-in-1 is made to be large, compared to that of the other one, so as to make it distinguishable from the other one-touch setting button 95.

In the fourth embodiment, it is also possible to select change content (one-touch setting button) one by one for every group, unless the plurality of change contents in a unit of a group of setting items includes exclusive processing. Further, the number of groups of setting items to be displayed, the number of one-touch setting buttons to be displayed within the group concerned, etc., are not limited to those indicated in the abovementioned example, but it is also applicable that the concerned numbers are established as appropriate numbers, depending on various kinds of conditions, such as a number of groups of setting items (change contents), a size of each one-touch setting button, a size of a button displaying area provided in the setting item change screen 90, etc.

Further, in the fourth embodiment, the candidates of change contents are displayed in such a manner that the plural (two or more) setting values (options) are displayed in a unit of group of setting items as the buttons (one-touch setting buttons) for every setting value (unit of selection=setting value). However, it is also applicable that a group of setting items (such as a name of group, etc.) is displayed as a button (unit of selection=group of setting items). Further, it is also applicable that, by depressing the abovementioned button of the group of setting items, the options, other than the setting values within the concerned group, are displayed as buttons (one-touch setting buttons) in detail (unit of selection=setting item).

As described in the above, according to the fourth embodiment, with respect to the group of setting items having three or more options of setting values, by displaying at least two options among the options other than the current setting values as the candidates of change contents (one-touch setting buttons) in a unit of group concerned, it becomes easy to conduct the setting change for every group of setting items. Further, by displaying the options, which serve as the candidates of change contents within a certain group of setting items, according to the predetermined priority order, it becomes easy to conduct the setting change within the group of setting items.

In this connection, it is applicable that the operation for preferentially displaying the candidates of change contents in a unit of group of setting items, described in the fourth embodiment, is conducted on the basis of the change history in the past as described in the third embodiment.

Referring to the drawings, the embodiments of the present invention have been detailed in the foregoing. However, the scope of the present invention is not limited to the embodiments described in the foregoing. Additions and modifications made by a skilled person without departing from the spirit and scope of the present invention shall be included in the scope of the present invention.

For instance, it is applicable that the apparatus is so constituted that an authenticating function of the concerned MFP changes the past print job, setting contents (set of setting values) of which are compared with those of the current print job receiving the change request to extract the differential components, so as to change the object (comparison and differential component extracting object). For instance, it is applicable that, by combining an individual authenticating function or a group authenticating function, the setting contents are compared so as to extract the differential components, while regarding the past print job, controlled for every individual or every group, as its object.

The scope of kinds of jobs that receive the change request is not limited to the print jobs described in the aforementioned embodiments, but a facsimile job, etc. may be also included in the applicable scope. For instance, when the setting items, such as the color/monochrome, etc., is changeable for the facsimile job in mid-course of transmitting facsimile data, it is also applicable that the apparatus is so constituted that the candidates of change contents as described in the aforementioned embodiments are displayed onto a setting change screen of the facsimile job concerned.

Further, it is also applicable that the candidates of change contents are displayed onto a certain setting change screen other than that for the job. For instance, it is applicable that the candidates of change contents, serving as those described in the aforementioned embodiments, are displayed onto such a setting change screen that is used for setting a plurality of setting items provided for the apparatus itself or used for setting operations (such as a power saving mode, etc.) other than the job.

Although, in the aforementioned embodiments, the candidates of change contents are displayed as the buttons (one-touch setting buttons) that indicate the concerned change contents and accept the instructions for changing the settings to the concerned change contents, the scope of the displaying mode is not limited to the abovementioned buttons. It is also applicable that the apparatus is so constituted that the setting values and setting items, serving as the candidates of change contents, are displayed as icons, etc., and the instructions for changing the settings to the concerned change contents are accepted by other buttons. For instance, it is applicable that the apparatus is so constituted that any one of the icons, etc., displayed corresponding to the candidates of change contents, is selected by operating a cursor key or the like, and then, an installation button is depressed so as to fix the setting change concerned.

With respect to the operation for weighting the setting values of differential components, it is also applicable that the concerned operation is conducted under a condition other than the "Accordance degree" described in the aforementioned embodiments. For instance, the concerned operation may be conducted under the condition, such as a number of setting operations conducted in the past, a number of setting change operations conducted in the past, etc.

Further, the present invention is applicable to not only the Multi Function Peripheral (image forming apparatus) described in the aforementioned embodiments, but also another information processing apparatus, such as a scanner, a copier, a printer, etc.

According to the information processing apparatus embodied in the present invention, it becomes possible to easily conduct a setting change operation for a plurality of setting items after the concerned setting operation has been completed.

While the preferred embodiments of the present invention have been described using specific term, such description is for illustrative purpose only, and it is to be understood that changes and variations may be made without departing from the spirit and scope of the appended claims.

What is claimed is:

1. An information processing apparatus, comprising:
   an operating section that accepts an operation for establishing a set of setting values for a plurality of setting items, the setting values being updatable by a user, therefrom;
   a storage section that newly stores the set of setting values established by the user, therein, when receiving a completion notice of establishing the set of setting values from the operating section;
   a display section; and
   a controlling section to control the display section;
   wherein, when receiving a request for updating the set of setting values established in advance through the operating section, the controlling section calculates difference values between the set of setting values to be updated and each of other sets of setting values stored in advance in the storage section; and
   wherein, based on the difference values above-calculated, the controlling section controls the display section so as to display at least one candidate of update contents onto the display section, and
   wherein, with respect to every one of the sets of setting values stored in advance in the storage section, the controlling section conducts weighting operations for every one of setting values extracted as the difference values, and accumulates weights derived from the weighting operations for every one of the setting values extracted as the difference values to find accumulated weighting values, and then, controls the display section to display the at least one candidate of update contents onto the display section according to a priority order determined based on the accumulated weighting values above-found, without displaying information in regard to a specific setting item that does not correspond to the at least one candidate of update contents among the plurality of setting items.

2. The information processing apparatus of claim 1, wherein, with respect to every one of the sets of setting values stored in advance in the storage section, the controlling section conducts the weighting operations for every one of the sets of setting values, corresponding to a ratio of setting items, setting values of which coincide with setting values included in the set of setting values to be updated in response to the request for updating.

3. The information processing apparatus of claim 1, wherein the setting items includes a group of setting items, which have three or more options of setting values; and wherein, with respect to the group of setting items, the controlling section displays at least two options, among options of setting values excepting setting values in a group of setting items in regard to the set of setting values to be updated in response to the request for changing, as the at least one candidate of update contents onto the display section in a unit of the group of setting items.

4. The information processing apparatus of claim 3, wherein the controlling section determines a display order of the options serving as the at least one candidate of update contents within a single group of setting items, based on a predetermined priority order.

5. The information processing apparatus of claim 1, wherein the set of setting values is a combination of setting values that specify processing conditions of a job.

6. The information processing apparatus of claim 5, wherein, when receiving a request for updating, inputted from the operating section with respect to the set of setting values in regard to the job, which is to be updated in response to the request for updating, during an implementation of the job, the controlling section continues the implementation of the job, while reflecting the updated setting onto the set of setting values in regard to the job.

7. The information processing apparatus of claim 5, wherein, when receiving a request for updating inputted from the operating section with respect to the set of setting values in regard to the job, which is to be updated in response to the request for updating, during an implementation of the job, the controlling section cancels the job being in mid-course of its implementation, to create a new job including a new set of setting values onto which the setting update is reflected.

8. An information processing apparatus comprising:
an operating section that accepts an operation for establishing a set of setting values for a plurality of setting items, the setting values being updatable by a user, therefrom;
a storage section that newly stores the set of setting values established by the user, therein, when receiving a completion notice of establishing the set of setting values from the operating section;
a display section; and
a controlling section to control the display section;
wherein, when receiving a request for updating the set of setting values established in advance through the operating section, the controlling section calculates difference values between the set of setting values to be updated and each of other sets of setting values stored in advance in the storage section; and
wherein, based on the difference values above-calculated, the controlling section controls the display section so as to display at least one candidate of update contents onto the display section, without displaying information in regard to a specific setting item that does not correspond to said at least one candidate of update contents among the plurality of setting items; and
wherein, when receiving an operation for updating the set of setting values through the operating section, the storage section newly stores a first set of setting values, which has been updated by the user from the set of setting values in response to the request for updating, therein, while correlating the first set of setting values with a second set of setting values, serving as the set of setting values before updating, so as to reserve a plurality of the first sets of setting values and a plurality of the second sets of setting values, correlated with each other; and
wherein the controlling section specifies or selects a specific first set of setting values, which is correlated with a specific second set of setting values that coincide with those included in the second set of setting values to be updated most recently, and then, determines said at least one candidate of update contents, based on the difference values between the second set of setting values to be updated most recently and the specific first set of setting values.

9. The information processing apparatus of claim 8, wherein, with respect to every one of the sets of setting values stored in advance in the storage section, the controlling section conducts weighting operations for every one of setting values extracted as the difference values, and accumulates weights derived from the weighting operations for every one of the setting values extracted as the difference values to find accumulated weighting values, and then, controls the display section to display said at least one candidate of update contents onto the display section according to a priority order determined based on the accumulated weighting values above-found.

* * * * *